United States Patent
Kikuzuki

(10) Patent No.: US 10,075,960 B2
(45) Date of Patent: Sep. 11, 2018

(54) BASE STATION APPARATUS, RADIO COMMUNICATION SYSTEM, AND COMMUNICATION METHOD

(71) Applicant: FUJITSU LIMITED, Kawasaki-shi, Kanagawa (JP)

(72) Inventor: Tatsuya Kikuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 13/892,549

(22) Filed: May 13, 2013

(65) Prior Publication Data

US 2014/0064197 A1    Mar. 6, 2014

(30) Foreign Application Priority Data

Aug. 28, 2012 (JP) ................................ 2012-187952

(51) Int. Cl.
*H04W 4/00* (2018.01)
*H04W 72/08* (2009.01)
*H04W 36/20* (2009.01)
*H04W 84/18* (2009.01)

(52) U.S. Cl.
CPC ......... *H04W 72/082* (2013.01); *H04W 36/20* (2013.01); *H04W 84/18* (2013.01)

(58) Field of Classification Search
CPC . H04W 52/146; H04W 72/085; H04W 72/10; H04W 36/30; H04W 72/12; H04W 72/1226; H04W 74/085; H04L 1/0003
USPC .......................................... 370/329; 455/450
See application file for complete search history.

(56) References Cited

U.S. PATENT DOCUMENTS

| 2003/0219002 | A1 | 11/2003 | Kishida |
| 2004/0053621 | A1 | 3/2004 | Sugaya |
| 2004/0185861 | A1* | 9/2004 | Domon ................ H04W 72/02 455/450 |
| 2006/0058054 | A1* | 3/2006 | Hiramatsu .................... 455/522 |
| 2006/0077997 | A1* | 4/2006 | Yamaguchi ......... H04L 12/2803 370/445 |

(Continued)

FOREIGN PATENT DOCUMENTS

| CN | 1520067 A | 8/2004 |
| CN | 1756204 A | 4/2006 |

(Continued)

OTHER PUBLICATIONS

Japanese Office Action dated Aug. 16, 2016 in corresponding Japanese Patent Application No. 2012187952.
Chinese Office Action dated Apr. 17, 2017 in related Chinese Application No. 201310218322.9.

(Continued)

*Primary Examiner* — Brandon Renner
*Assistant Examiner* — Abdeltif Ajid
(74) *Attorney, Agent, or Firm* — Staas & Halsey LLP

(57) ABSTRACT

A base station apparatus that communicates with a radio communication terminal in a radio communication system, includes: processor configured to detect interference between the radio communication system and another radio communication system, and determine whether or not to switch a radio channel used to communicate with the radio communication terminal when the interference is detected; and a channel switching unit that switches the radio channel when the processor determines to switch the radio channel, and does not switch the radio channel when the processor determines not to switch the radio channel.

7 Claims, 14 Drawing Sheets

(56) References Cited

U.S. PATENT DOCUMENTS

| | | | |
|---|---|---|---|
| 2006/0079183 A1* | 4/2006 | Song et al. .................. 455/63.1 |
| 2007/0093208 A1* | 4/2007 | Manjeshwar ....... H04W 72/082 |
| | | | 455/63.1 |
| 2007/0155377 A1* | 7/2007 | Horiguchi et al. ........ 455/422.1 |
| 2009/0067354 A1 | 3/2009 | Gao et al. |
| 2011/0096679 A1* | 4/2011 | Hayashino et al. .......... 370/252 |
| 2012/0195220 A1* | 8/2012 | Kurt .................... H04W 72/085 |
| | | | 370/252 |
| 2012/0315962 A1* | 12/2012 | Nakajima ......... H04W 52/0216 |
| | | | 455/574 |
| 2013/0331031 A1* | 12/2013 | Palin ................. H04W 52/0245 |
| | | | 455/41.2 |
| 2014/0206376 A1* | 7/2014 | Matsumoto ................ 455/452.2 |

FOREIGN PATENT DOCUMENTS

| | | |
|---|---|---|
| JP | 2003-249973 | 9/2003 |
| JP | 2004-40645 | 2/2004 |
| JP | 2005-286765 | 10/2005 |
| JP | 2006-109448 | 4/2006 |
| JP | 2009-523360 | 6/2009 |

OTHER PUBLICATIONS

Chinese Office Action dated Mar. 23, 2016 in corresponding Chinese Patent Application No. 201310218322.9.

Japanese Office Action dated Mar. 15, 2016 in corresponding Japanese Patent Application No. 2012-187952.

* cited by examiner

FIG. 6

| IDENTIFIER | SWITCHING DETERMINATION |
|---|---|
| 1 | × |
| 2 | ○ |
| 3 | × |
| 4 | − |
| 5 | ○ |
| 6 | × |
| 7 | ○ |
| 8 | × |

FIG. 9

| IDENTIFIER | SWITCHING DETERMINATION |
|---|---|
| 1 | × |
| 2 | × |
| 3 | × |
| 4 | − |
| 5 | ○ |
| 6 | ○ |
| 7 | ○ |
| 8 | ○ |

FIG. 10A

| IDENTIFIER | SWITCHING DETERMINATION |
|---|---|
| 1 | × |
| 2 | ○ |
| 3 | × |
| 4 | — |
| 5 | × |
| 6 | × |
| 7 | × |
| 8 | × |

FIG. 10B

| IDENTIFIER | SWITCHING DETERMINATION |
|---|---|
| 1 | ○ |
| 2 | ○ |
| 3 | ○ |
| 4 | ○ |
| 5 | — |
| 6 | ○ |
| 7 | × |
| 8 | ○ |

BASE STATION APPARATUS, RADIO COMMUNICATION SYSTEM, AND COMMUNICATION METHOD

CROSS-REFERENCE TO RELATED APPLICATION

This application is based upon and claims the benefit of priority of the prior Japanese Patent Application No. 2012-187952, filed on Aug. 28, 2012, the entire contents of which are incorporated herein by reference.

FIELD

The embodiments discussed herein are related to a base station apparatus, a radio communication system, and a communication method.

BACKGROUND

In a radio communication system, a base station apparatus and a radio communication terminal apparatus in the same network share the same frequency channel. When a plurality of networks are present in neighboring areas, inter-network interference may be avoided by causing the networks to use different frequency channels.

When the base station apparatuses are immobile, the inter-network interference may be avoided by designing the networks in advance so that the frequency channels to be used by the networks are different from each other. However, when the base station apparatuses are mobile, to previously expect which networks will approach each other is difficult and thus, to previously avoid the inter-network interference by the network design is difficult.

FIGS. 1A and 1B are explanatory views for an example of a scene in which inter-network interference occurs. Each of references 1, 100, and 200 denotes a network that includes a base station apparatus and radio communication terminal apparatuses. As illustrated in FIG. 1A, a case in which the networks 1 and 200 are adjacent and the networks 1 and 100 are not adjacent at some point in time is assumed. In this case, the inter-network interference may be temporarily avoided when the network design is performed so that the networks 1 and 200 use different frequency channels and the networks 1 and 100 use the same frequency channel.

However, as illustrated in FIG. 1B, when the network 100 approaches the network 1 after that, interference occurs between the networks 1 and 100 that use the same frequency channel.

As a technique for avoiding inter-network interference, for example, channel hopping described in Institute of Electrical and Electronics Engineers (IEEE) 802.15.6 is known. Even when interference is caused, the possibility of avoiding the interference at a next hopping timing is raised by causing the channel hopping to work continuously.

However, when the number of usable channels is small, the channels selected at a hopping timing may correspond coincidentally and the possibility of causing another interference is raised. Thus, there is also a method in which channels are changed only when interference is caused. In the description below, this technique may be referred to as "Related Art 1".

As a relevant technique, an apparatus and a method for avoiding a channel collision in regional radio networks are known. A medium access controller that performs switching for a base station from a first channel to a second channel at time t is provided. The medium access controller includes a switching time delay circuit that delays the switching with regard to the time t until random delay time. This technique may be referred to as "Related Art 2".

For example, see Japanese National Publication of International Patent Application No. 2009-523360.

In Related Art 1, recollision occurs when the frequency channels respectively reselected for the networks that interfere with each other are the same. FIG. 2 is an explanatory view for an example of a scene in which the recollision occurs. It is assumed that in an ith super frame, both of the networks 1 and 100 use a frequency channel Ch1 and a channel collision has occurred between the networks 1 and 100.

After that, in a (i+1)th super frame, the networks 1 and 100 switch the frequency channel for use so as to avoid the interference. However, since both of the networks 1 and 100 switch the frequency channels for use to a frequency channel Ch2, which is the same selection again, the channel collision occurs again.

After that, when the networks 1 and 100 switch the frequency channels for use to a frequency channel Ch3 and the frequency channel Ch1, respectively, in a (i+2)th super frame, the interference between the networks 1 and 100 is avoided.

In Related Art 2, since a delay time before channel switching is determined randomly, recollisions caused by switching the previous channel to the same channel at the same time as another base station may be reduced. However, still in Related Art 2, the possibility of switching the channel with the same delay time as the delay time for the other base station remains and in this case, the channel collision may occur again.

SUMMARY

According to an aspect of the embodiment, a base station apparatus that communicates with a radio communication terminal in a radio communication system, includes: a processor configured to detect interference between the radio communication system and another radio communication system, and determine whether or not to switch a radio channel used to communicate with the radio communication terminal when the interference is detected; and a channel switching unit that switches the radio channel when the processor determines to switch the radio channel, and does not switch the radio channel when the processor determines not to switch the radio channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates a first example of a switching terminal designation list;

FIG. 9 illustrates a second example of the switching terminal designation list;

FIGS. 10A and 10B illustrate a third example of the switching terminal designation list;

DESCRIPTION OF EMBODIMENTS

Preferred embodiments are described below with reference to the accompanying drawings. The base station, the radio communication system, and the radio communication method of this disclosure are not limited by the below-described embodiments.

1. Embodiments 1.1. Configuration of Radio Communication System

Figure 1A:
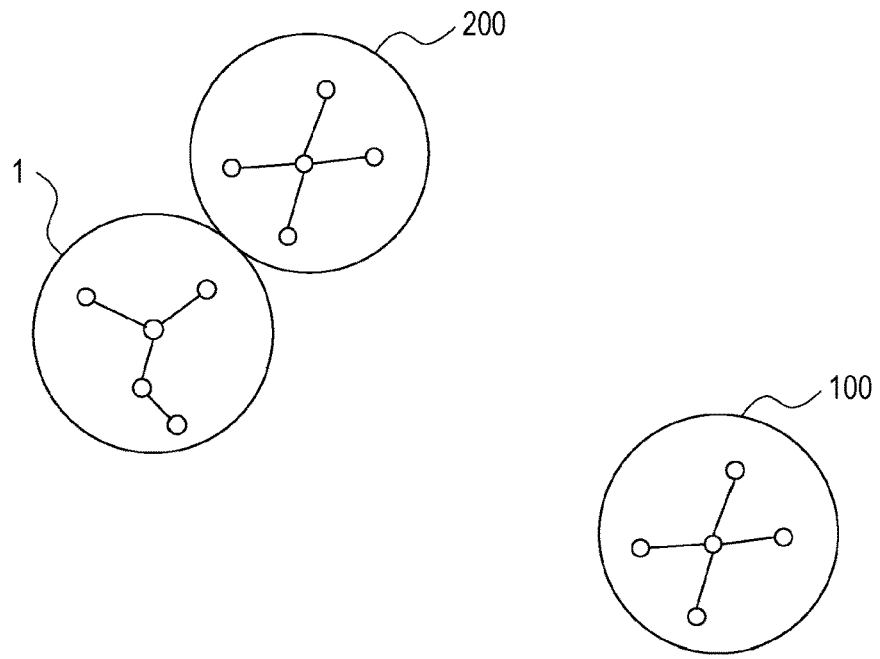
FIGS. 1A and 1B are explanatory views for an example of a scene in which inter-network interference occurs.
Figure 1B:
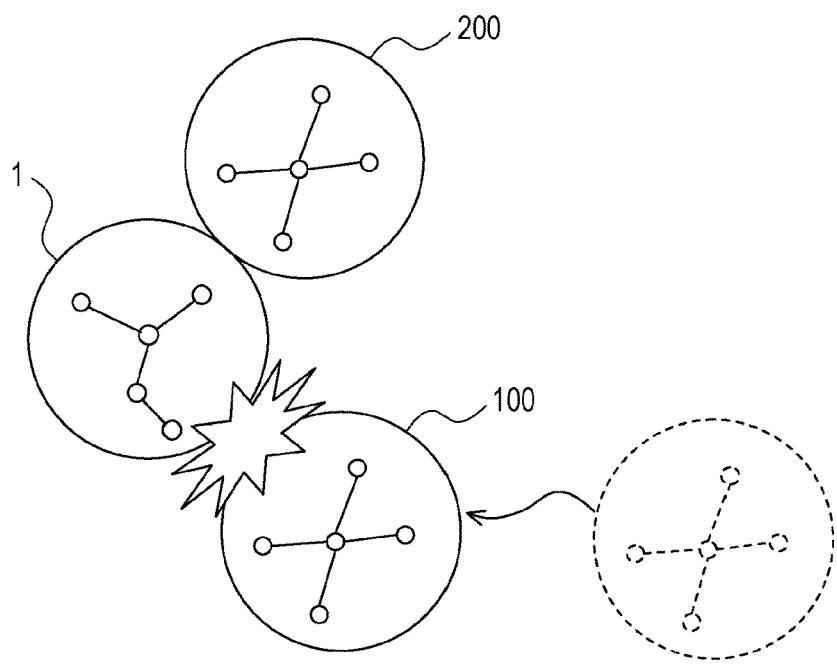
Figure 2:
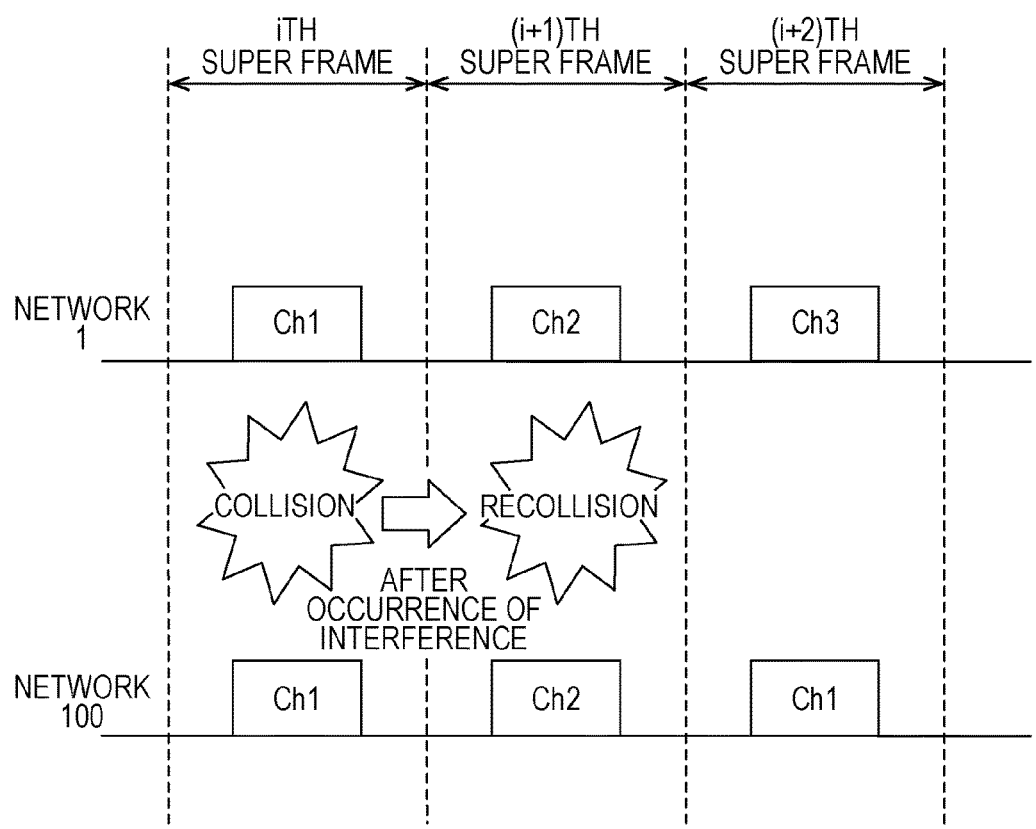
FIG. 2 is an explanatory view for an example of a scene in which recollision occurs.
Figure 3:
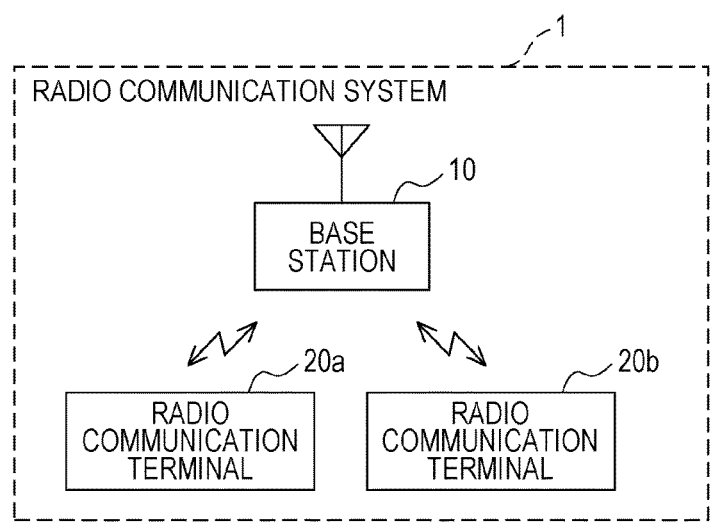
FIG. 3 is an explanatory view for configuration examples of radio communication systems.
Figure 3:
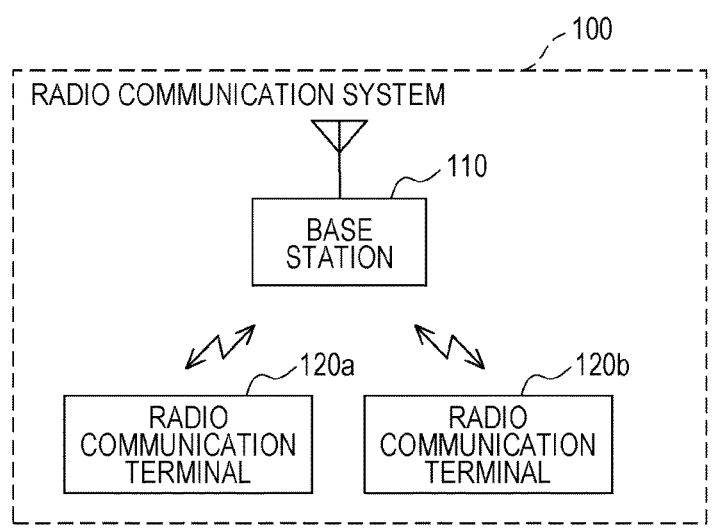

FIG. 3 is an explanatory view for configuration examples of radio communication systems 1 and 100. The radio communication system 1 includes a base station apparatus 10 and radio communication terminal apparatuses 20a and 20b. In the description below and the accompanying drawings, the base station apparatus and the radio communication terminal apparatus are also referred to as the "base station" and the "radio communication terminal" respectively. Furthermore, in the description below, the radio communication terminals 20a and 20b are also referred to as the "radio communication terminal 20" collectively.

The base station 10 is coupled between the radio communication terminals 20a and 20b so as to be able to transmit and receive various kinds of signals and data in the form of packets via radio channels. The radio channel may be a channel according to any communication standard, such as ZigBee (trademark), Bluetooth (trademark), or a body area network (BAN).

Also, the base station 10 may scan a radio signal present in the vicinity of the base station 10 together with a radio signal from the radio communication terminal 20. Thus, for example, the base station 10 may acquire a network identifier of another network when the network handles similar kinds of packets. For example, the base station 10 may receive a radio signal transmitted in the radio communication system 100, which is another radio communication system present in the vicinity of the radio communication system 1, and acquire a network identifier of the radio communication system 100.

The radio communication system 100 is a radio communication system present in the vicinity of the radio communication system 1 and different from the radio communication system 1, and includes a base station 110, and radio communication terminals 120a and 120b. The base station 110 is coupled to the radio communication terminals 120a and 120b via radio channels according to a communication standard similar to the communication standard of the radio channel between the base station 10 and the radio communication terminal 20 in the radio communication system 1.

The channel switching of the radio channel in the radio communication system 1 is performed when the base station 10 transmits a control packet for the channel switching to the radio communication terminal 20. The radio communication terminal 20 transmits packets addressed to the base station 10 individually using a radio channel in a direction to the base station 10. When the radio communication terminal 20 receives the control packet for the channel switching from the base station 10, the channel to be used is switched to the radio channel designated by the control packet.

1.2. Configuration of Base Station 10

Figure 4:
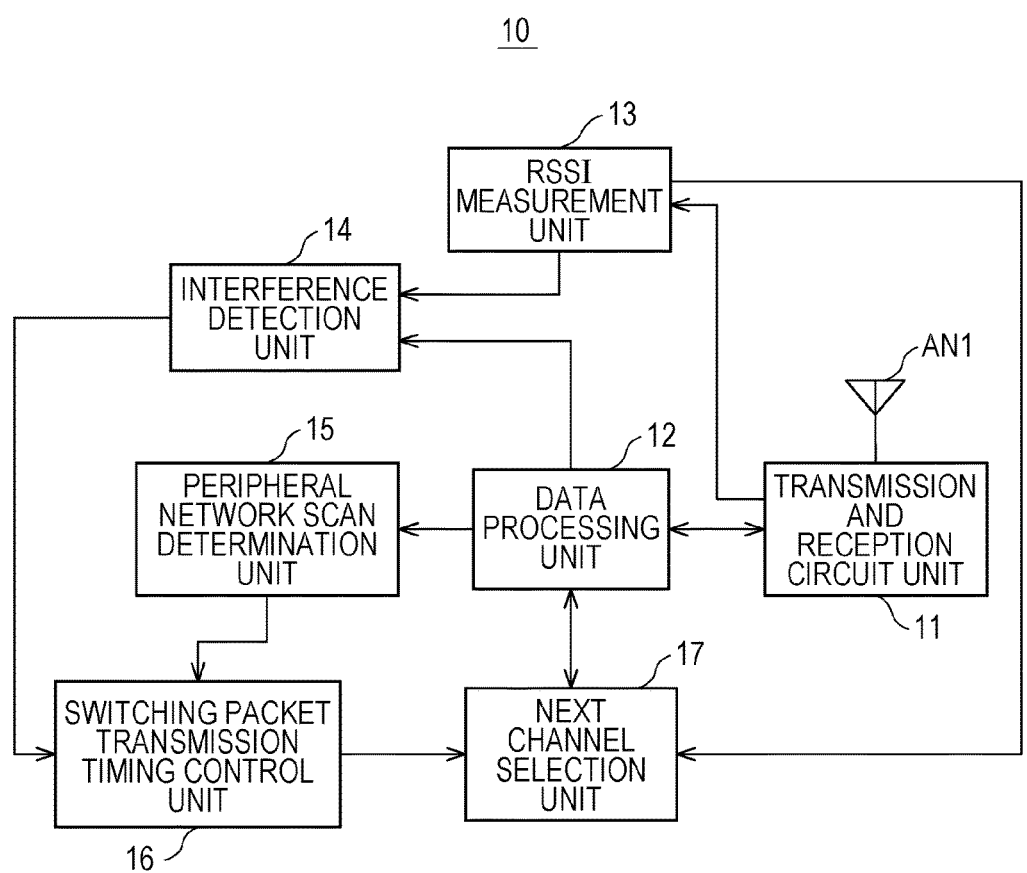
FIG. 4 is an explanatory view for a configuration example of a base station apparatus.

FIG. 4 is an explanatory view for a configuration example of the base station 10. The base station 10 includes an antenna AN1, a transmission and reception circuit unit 11, a data processing unit 12, a received signal strength indication (RSSI) measurement unit 13, and an interference detection unit 14. The base station 10 further includes a peripheral network scan determination unit 15, a switching packet transmission timing control unit 16, and a next channel selection unit 17. Each of these components in the configuration is coupled so as to be able to input and output signals and data unidirectionally or bidirectionally. The functional configuration view in FIG. 4 chiefly illustrates a configuration relating to the functions of the base station 10 described in the present embodiment. The base station 10 may include other elements than the illustrated components.

The transmission and reception circuit unit 11 performs transmission and reception of packets with the radio communication terminal 20 via a radio channel. Furthermore, the transmission and reception circuit unit 11 scans the network identifier of the radio communication system 100, which is another radio communication system present in the vicinity of the radio communication system 1, and transmits the control packet for the channel switching to the radio communication terminal 20.

Figure 5:
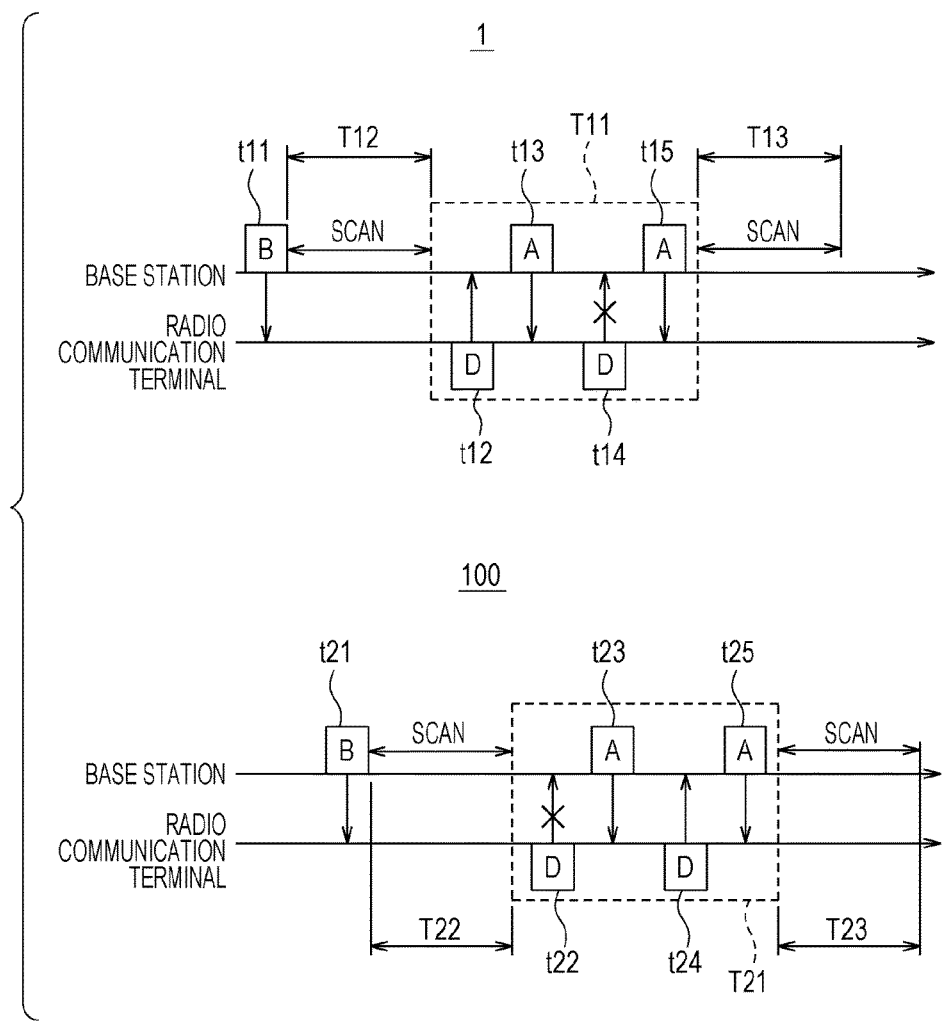
FIG. 5 is an explanatory view for an example of operations for acquiring a network identifier of another radio communication system present in the vicinity.

FIG. 5 is an explanatory view for an example of operations for acquiring the network identifier of the radio communication system 100 present in the vicinity of the radio communication system 1. Here, a scene in which the radio communication systems 1 and 100 use the same radio channel and interfere with each other is assumed. In the present example, a case in which a super frame structure is used for the radio communication in the radio communication systems 1 and 100, and the super frame includes a beacon packet and a non-competition period is assumed.

At time t11, the base station 10 of the radio communication system 1 transmits a beacon packet "B" at the beginning of the super frame. After that, a non-competition period T11 starts for the base station 10 and the radio communication terminal 20 of the radio communication system 1 to communicate with each other. In the non-competition period T11, since the radio communication terminal 20 transmits data in a time-division scheme, the radio communication terminal 20 may transmit data without competition. In the radio communication system 1, a data packet "D" is transmitted at time t12 and time t14 in the non-competition period T11, and an acknowledgment packet "A" with respect to the data packet "D" is transmitted at time t13 and time t15.

The radio communication in the radio communication system 100 has a similar structure, and a case in which, compared to the radio communication system 1, the radio communication in the radio communication system 100 is delayed by approximately one packet in a temporal axis is assumed. In FIG. 5, transmission time of a beacon packet "B" and a non-competition period in the radio communication system 100 are denoted by references t21 and T21, respectively. Furthermore, in the radio communication system 100, a data packet "D" is transmitted at time t22 and time t24, and an acknowledgment packet "A" is transmitted at time t23 and time t25.

In the example in FIG. 5, since the non-competition periods T11 and T21 of the radio communication systems 1 and 100 overlap in the temporal axis, the inter-network interference occurs. As a result, some packets are not transmitted normally. Here, a case in which the base station 10 fails to receive the data packet "D" transmitted at the time t14 normally and the base station 110 fails to receive the data packet "D" transmitted at the time t22 normally is assumed. In this case, the base stations 10 and 110 fail to receive packets normally at timings at which the packets are expected to arrive, and reception power at the base stations 10 and 110 are higher than a certain threshold value.

The transmission and reception circuit unit 11 of the base station 10 scans the network identifier of the radio communication system 100 included in the received signals in a period T12 preceding the non-competition period T11 and a period T13 subsequent to the non-competition period T11. Similarly, the base station 110 also scans the network identifier in a period T22 preceding the non-competition period T21 and a period T23 subsequent to the non-competition period T21.

For example, the transmission and reception circuit unit 11 may acquire the network identifier of the radio communication system 100 by receiving the beacon packet "B" transmitted in the radio communication system 100 in the scan period T12. Also, for example, the base station 110 may acquire the network identifier of the radio communication system 1 by receiving the data packet "D" transmitted in the radio communication system 1 in the scan period T22. Similarly, the transmission and reception circuit unit 11 of the base station 10 may acquire the network identifier of the radio communication system 100 by receiving the data packet "D" transmitted in the radio communication system 100 in the scan period T13. The scan may be performed continuously or may be started immediately after interference is detected in the non-competition period T11.

Refer to FIG. 4. The transmission and reception circuit unit 11 outputs the network identifier of the radio communication system 100 obtained as a result of the scan to the data processing unit 12.

Based on a certain program, the data processing unit 12 processes a packet received by the transmission and reception circuit unit 11. The data processing unit 12 outputs reception results of the packet to the interference detection unit 14. The data processing unit 12 outputs data for transmission, which has been processed based on the certain program, to the transmission and reception circuit unit 11 in the form of packets.

When the radio channel used by the radio communication system 1 is switched, the next channel selection unit 17 outputs designation information on the radio channel used after the switching to the data processing unit 12. The data processing unit 12 generates a control packet for the channel switching in accordance with the designation information on the radio channel. Furthermore, the data processing unit 12 receives the network identifier of the radio communication system 100 present in the vicinity of the radio communication system 1, which has been received by the transmission and reception circuit unit 11, from the transmission and reception circuit unit 11. The data processing unit 12 outputs the received network identifier to the peripheral network scan determination unit 15.

The RSSI measurement unit 13 measures the strength of reception power caused at the time of the packet reception. That is, the RSSI measurement unit 13 measures the RSSI using the packet input from the transmission and reception circuit unit 11. The RSSI measurement unit 13 outputs the measured reception power strength to the interference detection unit 14. Furthermore, the RSSI measurement unit 13 detects peripheral interference radio waves using the value of the RSSI.

Based on the output results of the data processing unit 12 and the RSSI measurement unit 13, the interference detection unit 14 determines whether or not the interference radio waves are present. As described above, when the interference is occurring, the base station 10 does not receive a packet normally at a timing at which the packet is expected to arrive and the reception power is higher than a certain threshold value. Therefore, for example, when no packet is output at a timing at which the packet is expected to be output from the data processing unit 12 and a result output from the RSSI measurement unit 13 at the timing exceeds a certain threshold value, the interference detection unit 14 may determine that the interference radio waves are present. The interference detection unit 14 outputs the determination result to the switching packet transmission timing control unit 16.

Based on the network identifier of the radio communication system 1 and the network identifier of the radio communication system 100 output from the data processing unit 12, the peripheral network scan determination unit 15 determines whether or not to switch the radio channel used by the radio communication system 1. The peripheral network scan determination unit 15 outputs the determination result to the switching packet transmission timing control unit 16.

Based on the network identifiers of the radio communication systems 1 and 100, the peripheral network scan determination unit 15 may determine whether or not to switch the radio channel used by the radio communication system 1 in accordance with calculation set by a certain program.

For example, when the network identifier is designated as an integer, the peripheral network scan determination unit 15 may determine whether or not to switch the radio channel used by the radio communication system 1 in accordance with following conditions (1) to (4).

Condition (1): When the value of the network identifier of the radio communication system 1 minus the value of the network identifier of the radio communication system 100 is a positive odd number, the radio channel used by the radio communication system 1 is not switched.

Condition (2): When the value of the network identifier of the radio communication system 1 minus the value of the network identifier of the radio communication system 100 is a positive even number, the radio channel used by the radio communication system 1 is switched.

Condition (3): When the value of the network identifier of the radio communication system 1 minus the value of the network identifier of the radio communication system 100 is a negative even number, the radio channel used by the radio communication system 1 is not switched.

Condition (4): When the value of the network identifier of the radio communication system 1 minus the value of the network identifier of the radio communication system 100 is a negative odd number, the radio channel used by the radio communication system 1 is switched.

When the determination is performed also for the radio communication system 100 in accordance with conditions (1) to (4), opposite results to the determination results for the radio communication system 1 are obtained. Accordingly, when the determination regarding whether or not to switch the radio channel is performed for each of the radio communication systems 1 and 100 that interfere with each other, it is determined that one of the radio communication systems switches the radio channel. Thus, it may be avoided that the same radio channel is selected for the radio communication systems 1 and 100 at the same time and the recollision of the radio channel is caused.

In another embodiment, the determination results based on the network identifier may be determined in advance as a switching terminal designation list and stored in a storage circuit, and in accordance with the switching terminal designation list, it may be determined whether or not to switch the radio channel used by the radio communication system 1.

FIG. 6 illustrates a first example of the switching terminal designation list. The switching terminal designation list in FIG. 6 is a list that provides the same determination results as the results according to conditions (1) to (4) described above when the network identifier of the radio communication system 1 indicates "4".

Symbol "○" indicates that the radio communication system 1 switches the radio channel. Symbol "x" indicates that the radio communication system 1 does not switch the radio channel, that is, that the radio communication system 100 switches the radio channel. The similar applies to the other switching terminal designation lists illustrated in FIGS. 9, 10A, and 10B.

For example, when the network identifier of the radio communication system 100 indicates "1", the value of the network identifier of the radio communication system 1, which is "4", minus the value of the network identifier of the radio communication system 100, which is "1", is "3", which is a positive odd number, and condition (1) is met. Thus, since the radio communication system 1 does not switch the radio channel, the determination result corresponds to "x".

For example, when the network identifier of the radio communication system 100 indicates "5", the value of the network identifier of the radio communication system 1, which is "4", minus the value of the network identifier of the radio communication system 100, which is "5", is "−1", which is a negative odd number, and condition (4) is met. Thus, since the radio communication system 1 switches the radio channel, the determination result corresponds to "○".

Refer to FIG. 4. The switching packet transmission timing control unit 16 determines the switching timing of the radio channel. When it is determined in the result output from the interference detection unit 14 that no interference is occurring, the radio channel is not switched. When it is determined in the result output from the peripheral network scan determination unit 15 that the radio communication system 1 does not switch the channel, the radio channel is not switched.

When the interference detection unit 14 determines that interference is occurring and when the peripheral network scan determination unit 15 determines that the radio communication system 1 switches the channel, the switching packet transmission timing control unit 16 determines the switching timing of the radio channel. For example, the switching packet transmission timing control unit 16 may determine a timing to switch the radio channel at a timing determined based on a certain program. The switching packet transmission timing control unit 16 may randomly select the switching timing of the radio channel from a plurality of alternatives.

Even when the interference detection unit 14 determines that interference is occurring, a situation in which the transmission and reception circuit unit 11 fails to detect the network identifier of the radio communication system 100 that is interfering may be caused. When such a situation occurs, the switching packet transmission timing control unit 16 determines a timing to switch the radio channel.

The next channel selection unit 17 determines a next channel to which the current radio channel is switched when the switching timing is determined by the switching packet transmission timing control unit 16. The next channel selection unit 17 may determine the next channel in an order determined by a certain program.

At a timing at which the switching timing has arrived, the next channel selection unit 17 may determine the next channel in accordance with the reception power strength of the radio channel, which is measured by the RSSI measurement unit 13. In addition, when the interference with the radio channel currently used is decreased at the timing at which the switching timing has arrived, the next channel selection unit 17 may stop the channel switching. When it is determined that the radio channel is switched, the next channel selection unit 17 outputs the designation information on the radio channel used after the switching to the data processing unit 12.

1.3. Operations of Base Station 10

Figure 7:
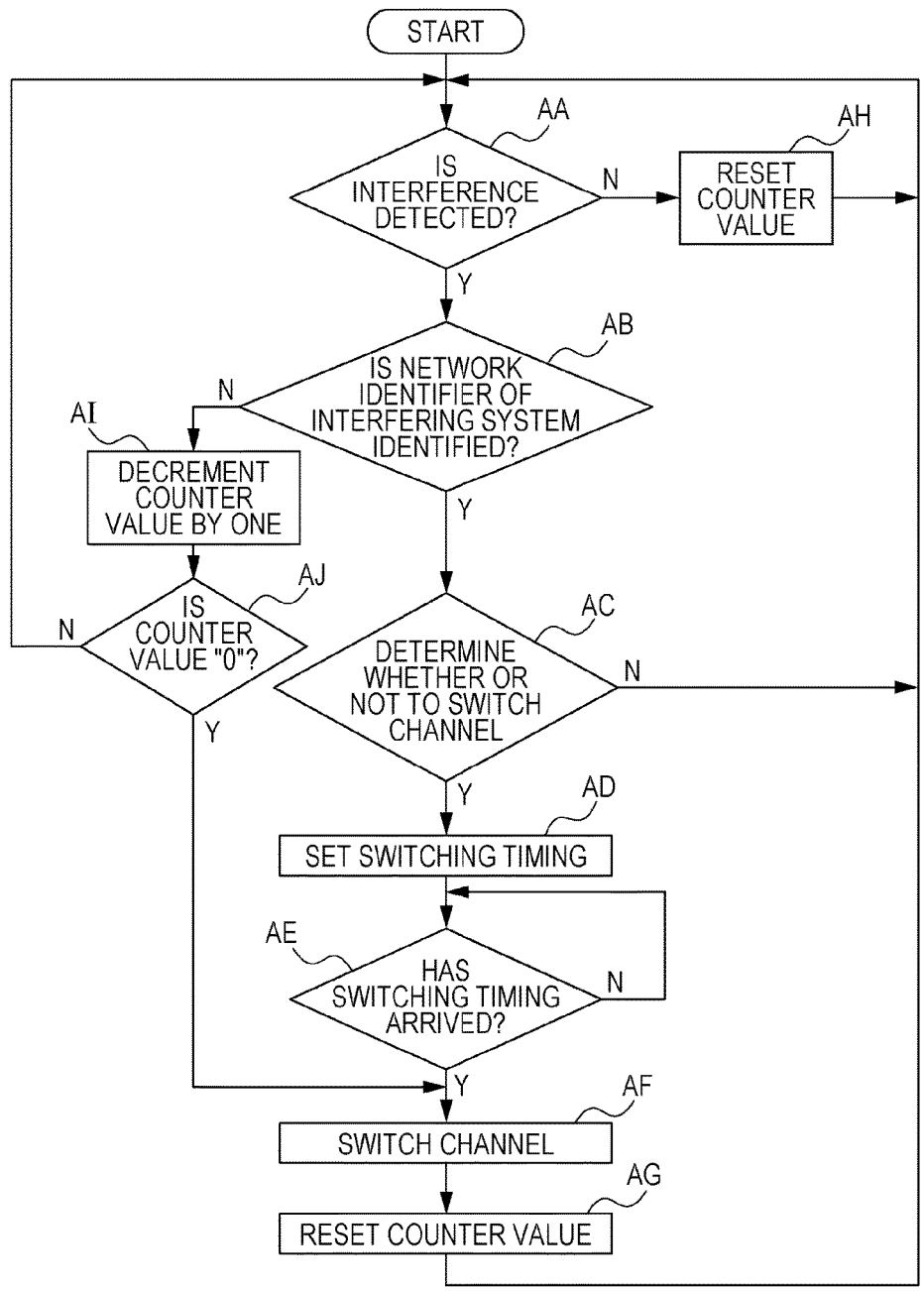
FIG. 7 is an explanatory flowchart for an example of operations of the base station apparatus.

Next, operations of the base station 10 are described. FIG. 7 is an explanatory flowchart for an example of the operations of the base station 10. The series of operations described below may be interpreted as a method including a plurality of procedures. In this case, an "operation" may be interpreted as a "step".

In operation AA, the transmission and reception circuit unit 11 and the data processing unit 12 receive packets. Based on the reception power strength obtained in the RSSI measurement unit 13, the interference detection unit 14 determines whether or not the interference radio waves are present when a packet is received. Whether or not the packet collision is present is determined with reference to a threshold value T1 preset for the interference detection unit 14.

When the value of the reception power strength exceeds the threshold value T1 while no packet is received, the interference detection unit 14 determines that the interference radio waves are present (operation AA: Y), the operations proceed to operation AB. When a packet is received or when the value of the reception power strength does not exceed the threshold value T1, the interference detection unit 14 determines that no interference radio waves are present (operation AA: N), the operations proceed to operation AH.

In operation AH, the switching packet transmission timing control unit 16 resets a value of a timing counter. When the interference detection unit 14 detects interference but the network identifier of the radio communication system 100 causing the interference is not detected, the timing counter is used to measure a delay time before the switching of the radio channel. The value of the timing counter may be a preset fixed value, or a value randomly selected from a preset range. After that, the operations return to operation AA.

In operation AB, based on information from the data processing unit 12, the peripheral network scan determination unit 15 determines whether or not the network identifier of the radio communication system 100 present in the vicinity of the radio communication system 1, which interferes with the radio communication system 1, has been identified. When the network identifier of the radio communication system 100 is identified (operation AB: Y), the operations proceed to operation AC. When the network identifier of the radio communication system 100 is not identified (operation AB: N), the operations proceed to operation AI.

In operation AC, in accordance with a combination of the network identifier of the radio communication system 1 and the network identifier of the radio communication system 100, the peripheral network scan determination unit 15 determines whether or not to switch the radio channel used by the radio communication system 1. When the radio channel used by the radio communication system 1 is not switched (operation AC: N), the operations return to operation AA. When the radio channel used by the radio communication system 1 is switched (operation AC: Y), the operations proceed to operation AD.

In operation AD, the switching packet transmission timing control unit 16 determines the switching timing of the radio channel. In operation AE, the next channel selection unit 17 determines whether or not the switching timing has arrived. When the switching timing has not arrived (operation AE: N), the operations return to operation AE. When the switching timing has arrived (operation AE: Y), the operations proceed to operation AF. The radio channel may be switched immediately after the switching of the radio channel has been determined in operation AC. In this case, operations AD and AE may be omitted.

In operation AF, the radio channel for the radio communication system 1 is switched. More specifically, the next channel selection unit 17 selects a new radio channel to be used after the switching, and outputs the designation information of the selected radio channel to the data processing unit 12. The data processing unit 12 and the transmission and reception circuit unit 11 transmit a control packet for the channel switching to the radio communication terminal 20 that belongs to the radio communication system 1. After that, the transmission and reception circuit unit 11 switches the radio channel of the base station 10. At this time, the RSSI measurement unit 13 may scan a peripheral vacant channel, the next channel selection unit 17 may select the vacant channel as the radio channel used after the switching, and the transmission and reception circuit unit 11 may change the radio channel for the radio communication system 1 to the vacant channel.

In operation AG, the switching packet transmission timing control unit 16 resets the timing counter. After that, the operations return to operation AA.

In operation AI, the switching packet transmission timing control unit 16 decrements the value of the timing counter by one. In operation AJ, the switching packet transmission timing control unit 16 determines whether or not the value of the timing counter has become "0". When the value of the timing counter is not "0" (operation AJ: N), the operations return to operation AA. When the value of the timing counter is "0" (operation AJ: Y), the operations proceed to operation AF. As a result, the radio channel for the radio communication system 1 is switched.

1.4. Hardware Configuration of Base Station 10

Figure 8:
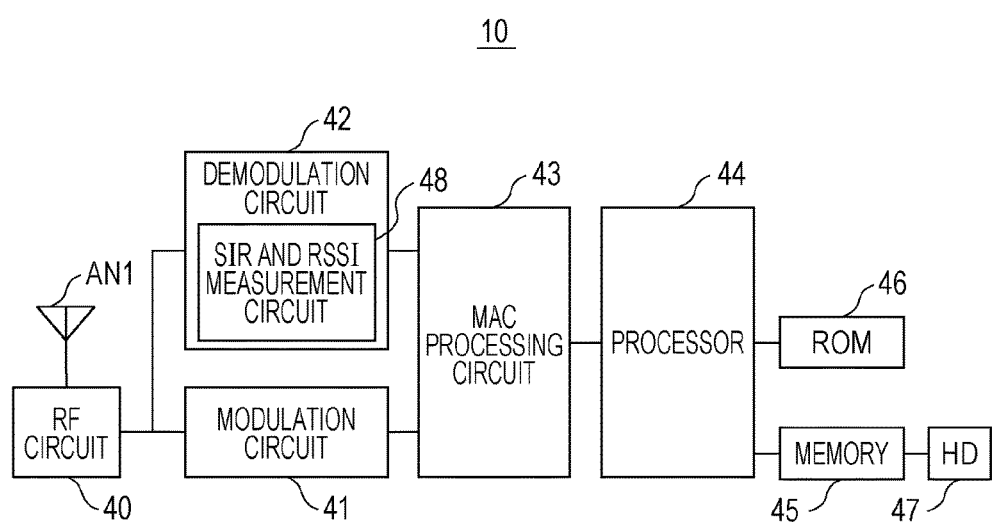
FIG. 8 is an explanatory view for an example of a hardware configuration of the base station apparatus.

Next, a hardware configuration of the base station 10 is described. FIG. 8 is an explanatory view for an example of the hardware configuration of the base station 10. The base station 10 includes a radio frequency (RF) circuit 40, a modulation circuit 41, a demodulation circuit 42, a media access control (MAC) processing circuit 43, a processor 44, memory 45, read only memory (ROM) 46, and a hard disk (HD) 47. The hardware configuration illustrated in FIG. 8 is a mere example for explaining the embodiment. The base station 10 described herein may employ any other hardware configuration when the hardware configuration implements operations described below.

The RF circuit 40, the modulation circuit 41, the demodulation circuit 42, the MAC processing circuit 43, the processor 44, the memory 45, the ROM 46, and the HD 47 are coupled so that various kinds of signals and data may be input and output. The RF circuit 40 is provided with the antenna AN1. The demodulation circuit 42 includes a signal-to-interference ratio (SIR) and RSSI measurement circuit 48.

For example, the processor 44 is a central processing unit (CPU), or a digital signal processor (DSP), and performs overall control of the base station 10. For example, the memory 45 includes a nonvolatile storage device such as flash memory, or random access memory (RAM) such as synchronous dynamic RAM (SDRAM). For example, the memory 45 stores the radio channel switching timing determined by the processor 44, and the like. For example, the ROM 46 stores a calculation expression for determining a switching order of the radio channel. Furthermore, the ROM 46 stores an algorithm used for determining whether or not to switch the radio communication system 1 switches the radio channel based on a combination of the network identifier of the radio communication system 1 and the network identifier of the radio communication system 100. For example, the HD 47 stores an RSSI threshold value for detecting the interference radio waves and the like in advance.

The above-described operations of the transmission and reception circuit unit 11 illustrated in FIG. 4 are implemented by cooperation of the RF circuit 40, the modulation circuit 41, and the demodulation circuit 42. The above-described operations of the data processing unit 12 are implemented by cooperation of the MAC processing circuit 43 and the processor 44. The above-described operations of the RSSI measurement unit 13 are implemented by the SIR and RSSI measurement circuit 48. The above-described operations of the interference detection unit 14, the peripheral network scan determination unit 15, the switching packet transmission timing control unit 16, and the next channel selection unit 17 are implemented by the processor 44.

1.5. Advantages

According to the present embodiment, when the radio communication system 1 and the radio communication system 100 interfere with each other, one of the radio communication system 1 and the radio communication system 100 switches the radio channel, and the other does not switch the radio channel. As a result, the possibility of causing recollision by switching the channel may be largely reduced.

In addition, since one of the radio communication system 1 and the radio communication system 100 that interfere with each other switches the radio channel, the channel recollision between the radio communication system 1 and the radio communication system 100 may be suppressed regardless of the length of the delay time before switching the radio channel. Thus, throughput may be enhanced by setting the delay time before the switching of the radio channel to be short.

1.6. Variations

The above-described embodiment exemplifies, as a technique for detecting the interference radio waves, that the reception power strength exceeds the threshold value T1 and no packet is received. In another embodiment, when the RF circuit 40 has received a beginning portion of a packet normally but has failed to receive the remaining portion, it may be determined that the interference radio waves are present. The beginning portion of the packet may be, for example, a header check sequence (HCS) or a preamble, and the remaining part of the packet may be, for example, payload or an inter-frame gap (IFG).

1.7. Applications

The radio communication system 1 according to the present embodiment is desirably applied to a network in which no excessive traffic occurs. This is because the radio communication system 1 involves a surplus period for scanning a peripheral network. In addition, the radio communication system 1 is desirably a network that is largely affected by the packet delay. This is because the radio communication system 1 may suppress the packet transmission delay resulting from the occurrence of interference. Furthermore, the radio communication system 1 is desirably a system in which interference with a similar kind of a network easily occurs. For example, the radio communication system 1 is desirably used when the radio communication system 1 itself moves and the total number of radio channels is smaller than the total number of networks. This is because the radio communication system 1 may suppress interference that occurs between similar kinds of networks.

From these viewpoints, the radio communication system 1 according to the present embodiment is preferably applied to, for example, a BAN. In the BAN, a sensor that corresponds to the radio communication terminal 20 is attached to a human body. In many cases, information sensed by the sensor is transmitted and received with a low frequency, such as about once per second, while the length of the packet is approximately one millisecond, and the amount of traffic in the information sensed by the sensor is small. In the BAN, since it is notified that a life or a body is in imminent danger, a packet largely affected by a delay may occur.

One of the scenes in which the BAN is used involves a demand in an intra-hospital regular medical checkup or the like. In such a scene, although the BAN is constructed for each patient, the number of radio channels is small in many cases, compared to the number of patients. Furthermore, since the patients move freely in the hospital, the networks also move accordingly.

Next, an example of another determination method for determining whether or not to switch the radio channel for the radio communication system 1 based on a combination of the network identifiers of the radio communication systems 1 and 100 is described.

When the value of the network identifier is designated as an integer, the peripheral network scan determination unit 15 may determine whether or not to switch the radio channel used by the radio communication system 1 in accordance with following conditions (11) and (12).

Condition (11): When the value of the network identifier of the radio communication system 1 minus the value of the network identifier of the radio communication system 100 is positive, the radio channel used by the radio communication system 1 is not switched.

Condition (12): When the value of the network identifier of the radio communication system 1 minus the value of the network identifier of the radio communication system 100 is negative, the radio channel used by the radio communication system 1 is switched.

In another embodiment, a switching terminal designation list that provides the same determination results as the results according to conditions (11) and (12) described above may be stored in advance in a storage circuit, and whether or not to switch the radio channel used by the radio communication system 1 may be determined in accordance with the switching terminal designation list. FIG. 9 illustrates a second example of the switching terminal designation list. The switching terminal designation list in FIG. 6 provides the same determination results as the results according to conditions (11) and (12) described above when the network identifier of the radio communication system 1 indicates "4".

For example, when the network identifier of the radio communication system 100 indicates "1", the value of the network identifier of the radio communication system 1, which is "4", minus the value of the network identifier of the radio communication system 100, which is "1", is "3", which is a positive value, and condition (11) is met. Thus, since the radio communication system 1 does not switch the radio channel, the determination result corresponds to "x".

For example, the network identifier of the radio communication system 100 indicates "5", the value of the network identifier of the radio communication system 1, which is "4", minus the value of the network identifier of the radio communication system 100, which is "5", is "−1", which is a negative value, and condition (12) is met. Thus, since the radio communication system 1 switches the radio channel, the determination result corresponds to "0".

According to the present embodiment, whether or not to switch the radio channel for the radio communication system 1 may be determined using conditional expressions simpler than determination conditions (1) to (4) according to the firstly-described embodiment. Thus, processing load of the base station 10 at the time of switching the radio channel may be reduced.

Next, based on a combination of the network identifiers of the radio communication systems 1 and 100, another example of the determination method for determining whether or not to switch the radio channel for the radio communication system 1 is described.

First, the radio communication systems are classified in advance into a group of the radio communication systems in which the number of times the radio channel is switched is large and a group of the radio communication systems in which the number of times the radio channel is switched is small. Hereinafter, the group of the radio communication systems in which the number of times the radio channel is switched is large is referred to as an "easy group" while the group of the radio communication systems in which the number of times the radio channel is switched is small is referred to as a "hard group".

When the value of the network identifier is designated as an integer, the peripheral network scan determination unit 15 may determine whether or not to switch the radio channel used by the radio communication system 1, in accordance with following conditions (21) to (23).

Condition (21): When the radio communication system 1 belongs to the "easy group" and the radio communication system 100 present in the vicinity of the radio communication system 1 belongs to the "hard group", the radio channel used by the radio communication system 1 is switched.

Condition (22): When the radio communication system 1 belongs to the "hard group" and the radio communication system 100 belongs to the "easy group", the radio channel used by the radio communication system 1 is not switched.

Condition (23): When both of the radio communication systems 1 and 100 belong to the "hard group" or both of the radio communication systems 1 and 100 belong to the "easy group", the peripheral network scan determination unit 15 performs the determination by, for example, the technique described in the firstly-described embodiment or the secondly-described embodiment.

In another embodiment, a switching terminal designation list that provides the same determination results as the results according to conditions (21) to (23) described above may be stored in advance in a storage circuit, and whether or not to switch the radio channel used by the radio communication system 1 may be determined in accordance with the switching terminal designation list.

FIGS. 10A and 10B illustrate a third example of the switching terminal designation list. In the present embodiment, radio communication systems with the network identifiers that indicate "1" to "4" belong to the "hard group", and the radio communication systems with the network identifiers that indicate "5" to "8" belong to the "easy group". When the radio communication systems 1 and 100 belong to the same group, the determination is performed by the method described in the firstly-described embodiment.

The switching terminal designation list in FIG. 10A provides the same determination results as the results according to conditions (22) and (23) described above when the network identifier of the radio communication system 1 indicates "4". When the network identifier of the radio communication system 1 indicates "4", the radio communication system 1 belongs to the "hard group". When the network identifier of the radio communication system 100 indicates "5", the radio communication system 100 belongs to the "easy group". Accordingly, condition (22) is met. Thus, since the radio communication system 1 does not switch the radio channel, the determination result corresponds to "x".

For example, when the network identifier of the radio communication system 100 indicates "1", both the radio communication system 100 and the radio communication system 1 belong to the "hard group". Thus, the determination is performed in accordance with conditions (1) to (4) of the firstly-described embodiment. In this case, since condition (1) is met and the radio communication system 1 does not switch the radio channel, the determination result corresponds to "x".

The switching terminal designation list in FIG. 10B provides the same determination results as the results according to conditions (21) and (23) described above when the network identifier of the radio communication system 1 indicates "5". When the network identifier of the radio communication system 1 indicates "5", the radio communication system 1 belongs to the "easy group". When the network identifier of the radio communication system 100 indicates "2", the radio communication system 100 belongs to the "hard group". Accordingly, condition (21) is met. Thus, since the radio communication system 1 switches the radio channel, the determination result corresponds to "○".

For example, when the network identifier of the radio communication system 100 indicates "7", both the radio communication system 100 and the radio communication system 1 belong to the "easy group". Thus, the determination is performed in accordance with conditions (1) to (4) of the firstly-described embodiment. In this case, since condition (3) is met and the radio communication system 1 does not switch the radio channel, the determination result corresponds to "x".

According to the present embodiment, the radio communication systems may be classified in advance into a group of the radio communication systems in which the radio channel is easily switched in case of interference and a group of the radio communication systems in which the radio channel is not easily switched in case of interference. The group of the radio communication systems in which the radio channel is not easily switched is less likely to undergo channel recollision after the switching than the group of the radio communication systems in which the radio channel is easily switched. Thus, according to the present embodiment, the channel recollision that occurs in a specific radio communication system after the channel switching may be reduced.

Next, an example of another determination method for determining whether or not to switch the radio channel for the radio communication system 1 is described based on a combination of the network identifiers of the radio communication systems 1 and 100.

In the present embodiment, whether or not the radio communication system 1 switches the radio channel is determined also using information included in header information of the packet received from each of the radio communication system 1 and the radio communication system 100.

For example, the header information of the packet includes information on the priority of data. For example, the peripheral network scan determination unit 15 determines that the radio communication system 1 belongs to the "easy group" when the priority of the data transmitted or received in the radio communication system 1 is ranked relatively low. When the priority of the data transmitted or received in the radio communication system 1 is ranked relatively high, it is determined that the radio communication system 1 belongs to the "hard group".

Similar to the thirdly-described embodiment, the peripheral network scan determination unit 15 determines whether or not to switch the radio channel used by the radio communication system 1 in accordance with conditions (21) and (22) described above. When the priority included in the header information of the packet is changed as the time passes, the group to which the radio communication system 1 belongs may be switched between the "easy group" and the "hard group".

When it is impossible to perform the determination based on the information included in the header information of the packet, the peripheral network scan determination unit 15 performs the determination based on a combination of the network identifiers of the radio communication systems 1 and 100. For example, the peripheral network scan determination unit 15 performs the determination by the technique described in the firstly-described embodiment or the secondly-described embodiment.

In another embodiment, the switching terminal designation list in FIG. 6, which is used in the firstly-described embodiment, or the switching terminal designation list used in the secondly-described embodiment may be stored in a storage circuit in advance. When it is impossible to perform the determination based on the information included in the header information of the packet, the peripheral network scan determination unit 15 may determine whether or not to switch the radio channel used by the radio communication system 1 in accordance with the switching terminal designation list.

According to the present embodiment, a radio communication system in which channel recollision after the switching does not easily occur may be obtained by changing the header information of the packet as time passes.

2. Simulation Results

Figure 11:
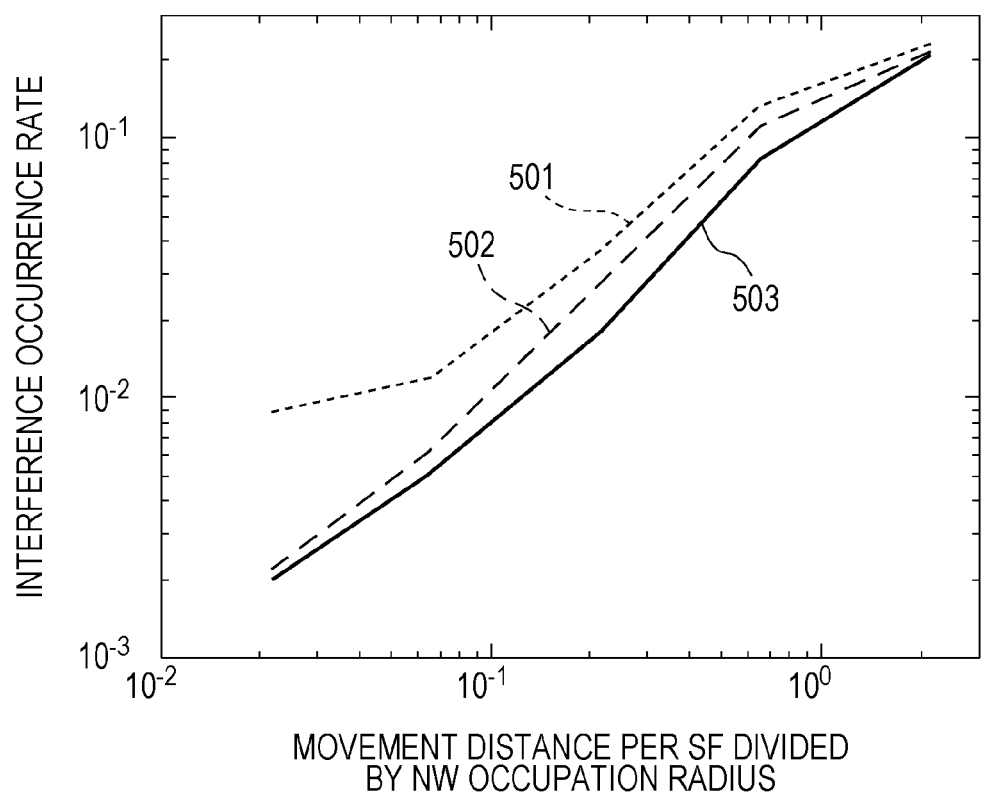
FIG. 11 is a graph illustrating an interference occurrence rate according to an embodiment.

Next, results of simulating the advantages of each of the above-described embodiments are described. FIG. 11 is a graph illustrating the interference occurrence rate according to the firstly-described embodiment. The horizontal axis indicates a value obtained by dividing a distance by which the radio communication system moves in one super frame period by a network (NW) occupation radius. The NW occupation radius is a maximum distance in which the radio communication systems interfere with each other.

References 501, 502, and 503 denote the interference occurrence rates according to Related Art 1, Related Art 2 and the firstly-described embodiment, respectively. In the firstly-described embodiment, the channel switching is performed after the delay time randomly selected in switching the radio channel has passed. As illustrated in FIG. 11, according to the firstly-described embodiment, the interference occurrence rate is reduced by a maximum of approximately 35%, compared to Related Art 2.

Figure 12:
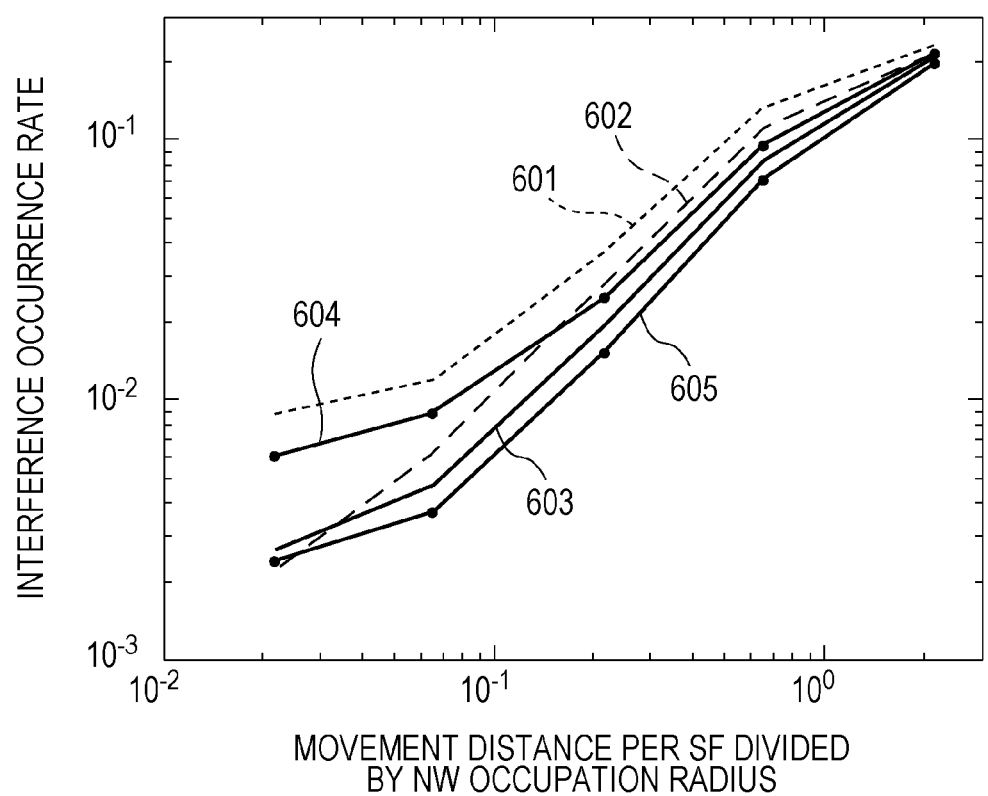
FIG. 12 is a graph illustrating interference occurrence rates according to another embodiment.

FIG. 12 is a graph illustrating the interference occurrence rates according to the secondly-described embodiment. References 601 and 602 denote the interference occurrence rates according to Related Art 1 and Related Art 2 respectively. References 603 to 605 denote the interference occurrence rates according to the secondly-described embodiment. Also in the secondly-described embodiment, the channel switching is performed after the delay time randomly selected in switching the radio channel has passed.

Reference 603 denotes an average interference occurrence rate and indicates results almost similar to the interference occurrence rate 503 of the firstly-described embodiment. Reference 604 denotes the occurrence rate of the interference that a radio communication system corresponding to a network identifier in a range of 10% ranked from the bottom of the entire range of network identifiers undergoes. Reference 605 denotes the occurrence rate of the interference that a radio communication system corresponding to a network identifier in a range of 10% ranked from the top of the entire range of network identifiers undergoes. There is a large difference between the interference occurrence rates 604 and 605, and the interference occurrence rate 604 is partially higher than the interference occurrence rate 602 according to Related Art 2. Meanwhile, the interference occurrence rate 605 is reduced, compared to the average interference occurrence rate 603.

Figure 13:
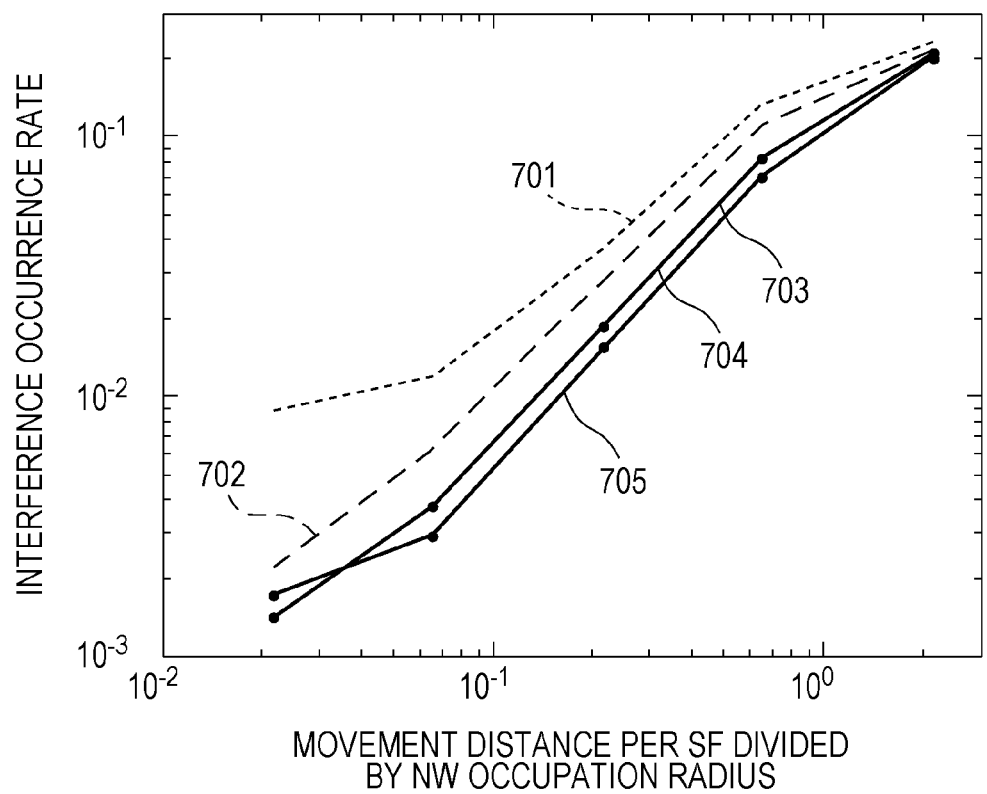
FIG. 13 is a graph illustrating interference occurrence rates according to still another embodiment.

FIG. 13 is a graph illustrating interference occurrence rates according to the thirdly-described embodiment. Similar results are obtained for the interference occurrence rate according to the fourthly-described embodiment. References 701 and 702 denote the interference occurrence rates according to Related Art 1 and Related Art 2, respectively. References 703 to 705 denote the interference occurrence rates according to the thirdly-described embodiment. Also in the thirdly-described embodiment, the channel switching is performed after the delay time randomly selected in switching the radio channel has passed.

Reference 703 denotes an average interference occurrence rate and indicates results almost similar to the interference occurrence rate 503 of the firstly-described embodiment. In the present embodiment, 90% of all of the radio communication systems belong to the "easy group" and remaining 10% belong to the "hard group". References 704 and 705 denote the occurrence rates of the interference that the radio communication systems belonging to the "easy group" and the "hard group" undergo, respectively. The interference occurrence rate 705 is reduced, compared to the average interference occurrence rate 703 and is reduced by a maximum of approximately 50%, compared to the interference occurrence rate 702 according to Related Art 2.

Figure 14:
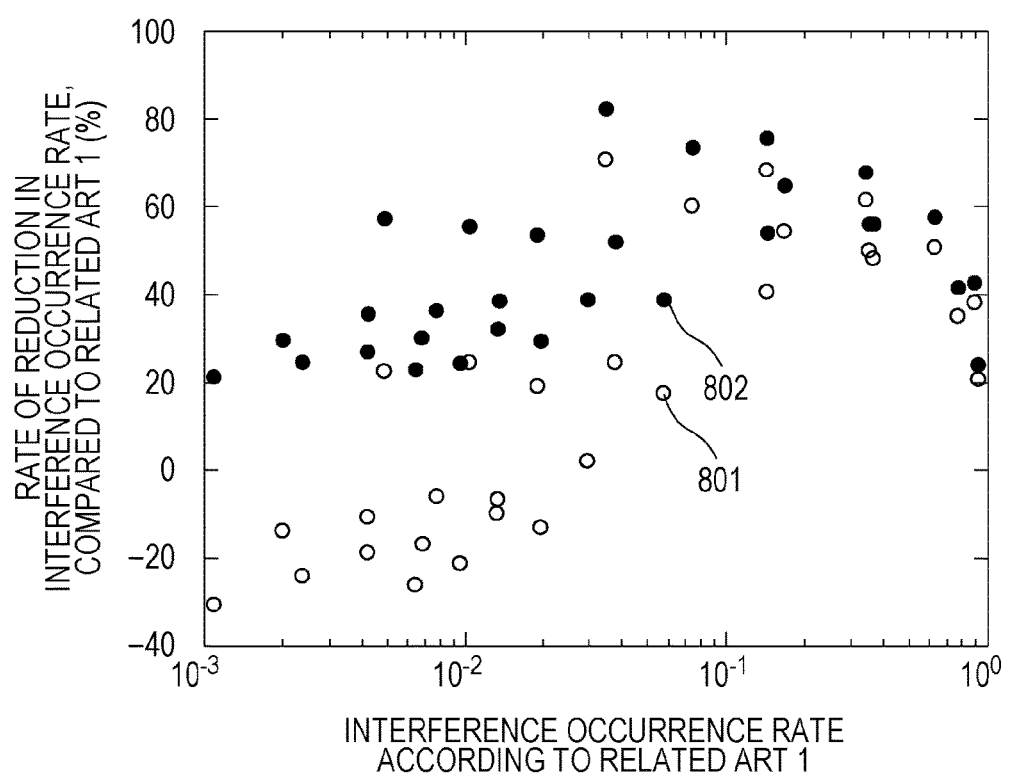
FIG. 14 is a graph illustrating rates of reduction in the interference occurrence rates in comparison with a related art.

FIG. 14 is a graph illustrating rates of reduction in the interference occurrence rates in comparison with Related Art 1. Reference 801 denotes the rate of reduction in the interference occurrence rate according to Related Art 2 in comparison with Related Art 1. Reference 802 denotes the rate of reduction in the interference occurrence rate according to the firstly-described embodiment in comparison with Related Art 1.

The horizontal axis indicates the interference occurrence rate according to Related Art 1. The range of parameters used for the simulation is based on the following expressions:

$$\text{(The area of a region for which the calculation is performed)}/(\text{the } NW \text{ occupation area} \times \text{the number of radio systems}) = 0.45 \text{ to } 3.7, \quad (1)$$

$$\text{The total number of usable radio channels} = 2 \text{ to } 15, \text{ and} \quad (2)$$

$$\text{(The distance by which the radio communication system moves in one super frame period)}/(\text{the } NW \text{ occupation radius}) = 0.2, \quad (3)$$

where the NW occupation area=$\pi \times$the NW occupation radius$\times$the NW occupation radius.

FIG. 14 indicates that according to the firstly-described embodiment, the interference occurrence rate is reduced, compared to Related Art 1 and Related Art 2. Furthermore, it is indicated that the lower interference occurrence rate is more likely to be reduced, compared to Related Art 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus that communicates with a radio communication terminal in a radio communication system, the base station apparatus comprising:
  a processor configured to:
    detect interference between the radio communication system and another radio communication system, and determine whether or not to switch a radio channel used to communicate with the radio communication terminal when the interference is detected;
switch the radio channel when the processor determines to switch the radio channel, and does not switch the radio channel when the processor determines not to switch the radio channel;
receive a second value assigned as a network identifier of the other radio communication system transmitted from the other radio communication system;
determine whether or not to switch the radio channel used to communicate with the radio communication terminal in accordance with a relation between a first value assigned as a network identifier of the radio communication system and the second value assigned as the network identifier of the other radio communication system, the radio channel of the radio communication system or the radio channel of the other radio communication system only being determined in the determination of the switching; and
when the identifier is designated as an integer, determine whether or not to switch the radio channel used to communicate with the radio communication terminal based on a first set of conditions, a second set of conditions, or a third set of conditions,
the first set of conditions including:
  a first condition that when the value of the identifier of the radio communication system minus the value of the identifier of the other radio communication system is a positive odd number, the radio channel is not switched;
  a second condition that when the value of the identifier of the radio communication system minus the value of the identifier of the other radio communication system is a positive even number, the radio channel is switched;
  a third condition that when the value of the identifier of the radio communication system minus the value of the identifier of the other radio communication system is a negative even number, the radio channel is not switched; and
  a fourth condition that when the value of the identifier of the radio communication system minus the value of the identifier of the other radio communication system is a negative odd number, the radio channel is switched,
the second set of conditions including:
  a fifth condition that when the value of the identifier of the radio communication system minus the value of the identifier of the other radio communication system is positive, the radio channel is not switched; and
  a sixth condition that when the value of the identifier of the radio communication system minus the value of the identifier of the other radio communication system is negative, the radio channel is switched,
the third set of conditions including:
  a seventh condition that when the radio communication system belongs to a first group and the other radio communication system belongs to a second group, the radio channel is switched;
  an eighth condition that when the radio communication system belongs to the second group and the other radio communication system belongs to the first group, the radio channel is not switched; and
  a ninth condition that when both of the radio communication system and the other radio communication system belong to the second group or both of the radio communication system and the other radio communication system belong to the first group, the processor performs the determination based on the first set of conditions or the second set of conditions;
wherein radio communication systems are classified in advance into a group of the radio communication systems in which a number of times the radio channel is switched is large and a group of the radio communication systems in which a number of times the radio channel is switched is small, the group of the radio communication systems in which the number of times the radio channel is switched is large is referred to as the first group while the group of the radio communication systems in which the number of times the radio channel is switched is small is referred to as the second group.

2. The base station apparatus according to claim 1, wherein
the processor is further configured to determine whether or not to switch the radio channel used to communicate with the radio communication terminal based on, in addition to the relation between the first value assigned as network identifier of the radio communication system and the second value assigned as network identifier of the other radio communication system, header information of packets transmitted in the radio communication system and the other radio communication system.

3. The base station apparatus according to claim 1, wherein
the processor is further configured to determine a switching timing of the radio channel used to communicate with the radio communication terminal when interference is detected and the processor is further configured to not receive the network identifier of the other radio communication system.

4. The base station apparatus according to claim 1, wherein
the processor is further configured to receive the network identifier of the other radio communication system in a period other than a non-competition period in which the radio communication terminal transmits data in a time-division scheme.

5. The base station apparatus according to claim 1, wherein
each of the network identifiers of the radio communication system and the other radio communication system is designated as an integer, and
the processor is further configured to determine whether or not to switch the radio channel used to communicate with the radio communication terminal based on the relation between the first value assigned as network identifier of the radio communication system and the second value assigned as network identifier of the other radio communication system so the interference does not occur on the radio channel.

6. A radio communication system, comprising:
a base station apparatus; and
a radio communication terminal,
the base station apparatus including
  a first processor configured to detect interference between the radio communication system and another radio communication system, and a second processor configured to:
- determine whether or not to switch a radio channel used to communicate with the radio communication terminal when the interference is detected by the first processor,
- switch the radio channel when the second processor determines to switch the radio channel, and does not switch the radio channel when the second processor determines not to switch the radio channel,
- receive a second value assigned as a network identifier of the other radio communication system transmitted from the other radio communication system, and
- determine whether or not to switch the radio channel used to communicate with the radio communication terminal in accordance with a relation between a first value assigned as network identifier of the radio communication system and the second value assigned as network identifier of the other radio communication system so interference does not occur on the radio channel, and
- when the identifier is designated as an integer, determine whether or not to switch the radio channel used to communicate with the radio communication terminal based on a first set of conditions, a second set of conditions, or a third set of conditions,
- the first set of conditions including:
  - a first condition that when the value of the identifier of the radio communication system minus the value of the identifier of the other radio communication system is a positive odd number, the radio channel is not switched;
  - a second condition that when the value of the identifier of the radio communication system minus the value of the identifier of the other radio communication system is a positive even number, the radio channel is switched;
  - a third condition that when the value of the identifier of the radio communication system minus the value of the identifier of the other radio communication system is a negative even number, the radio channel is not switched;
  - a fourth condition that when the value of the identifier of the radio communication system minus the value of the identifier of the other radio communication system is a negative odd number, the radio channel is switched,
- the second set of conditions including:
  - a fifth condition that when the value of the identifier of the radio communication system minus the value of the identifier of the other radio communication system is positive, the radio channel is not switched;
  - a sixth condition that when the value of the identifier of the radio communication system minus the value of the identifier of the other radio communication system is negative, the radio channel is switched,
- the third set of conditions including:
  - a seventh condition that when the radio communication system belongs to a first group and the other radio communication system belongs to a second group, the radio channel is switched;
  - an eighth condition that when the radio communication system belongs to the second group and the other radio communication system belongs to the first group, the radio channel is not switched; and
  - a ninth condition that when both of the radio communication system and the other radio communication system belong to the second group or both of the radio communication system and the other radio communication system belong to the first group, the second processor performs the determination based on the first set of conditions or the second set of conditions;
- wherein radio communication systems are classified in advance into a group of the radio communication systems in which a number of times the radio channel is switched is large and a group of the radio communication systems in which a number of times the radio channel is switched is small, the group of the radio communication systems in which the number of times the radio channel is switched is large is referred to as the first group while the group of the radio communication systems in which the number of times the radio channel is switched is small is referred to as the second group.

7. A communication method performed by a base station apparatus that communicates with a radio communication terminal in a radio communication system, the communication method comprising:
- detecting interference between the radio communication system and another radio communication system,
- determining whether or not to switch a radio channel used to communicate with the radio communication terminal when the interference between the radio communication system and the other radio communication system is detected,
- switching the radio channel when switching of the radio channel is determined, and not switching the radio channel when non-switching of the radio channel is determined,
- receiving a second value assigned as a network identifier of the other radio communication system transmitted from the other radio communication system, and
- determining whether or not to switch the radio channel used to communicate with the radio communication terminal in accordance with a relation between a first value assigned as the network identifier of the radio communication system and the second value assigned as the network identifier of the other radio communication system so interference does not occur on the radio channel, and
- when the identifier is designated as an integer, determining whether or not to switch the radio channel used to communicate with the radio communication terminal based on a first set of conditions, a second set of conditions, or a third set of conditions,
- the first set of conditions including:
  - a first condition that when the value of the identifier of the radio communication system minus the value of the identifier of the other radio communication system is a positive odd number, the radio channel is not switched;
  - a second condition that when the value of the identifier of the radio communication system minus the value of the identifier of the other radio communication system is a positive even number, the radio channel is switched;

a third condition that when the value of the identifier of the radio communication system minus the value of the identifier of the other radio communication system is a negative even number, the radio channel is not switched;

a fourth condition that when the value of the identifier of the radio communication system minus the value of the identifier of the other radio communication system is a negative odd number, the radio channel is switched, the second set of conditions including:

a fifth condition that when the value of the identifier of the radio communication system minus the value of the identifier of the other radio communication system is positive, the radio channel is not switched;

a sixth condition that when the value of the identifier of the radio communication system minus the value of the identifier of the other radio communication system is negative, the radio channel is switched, the third set of conditions including:

a seventh condition that when the radio communication system belongs to a first group and the other radio communication system belongs to a second group, the radio channel is switched;

an eighth condition that when the radio communication system belongs to the second group and the other radio communication system belongs to the first group, the radio channel is not switched;

a ninth condition that when both of the radio communication system and the other radio communication system belong to the second group or both of the radio communication system and the other radio communication system belong to the first group, performing the determination based on the first set of conditions or the second set of conditions;

wherein radio communication systems are classified in advance into a group of the radio communication systems in which a number of times the radio channel is switched is large and a group of the radio communication systems in which a number of times the radio channel is switched is small, the group of the radio communication systems in which the number of times the radio channel is switched is large is referred to as the first group while the group of the radio communication systems in which the number of times the radio channel is switched is small is referred to as the second group.

* * * * *